May 17, 1932.                C. W. MOORE                1,858,900
                               FILTER
                    Filed Dec. 10, 1928         2 Sheets-Sheet 1
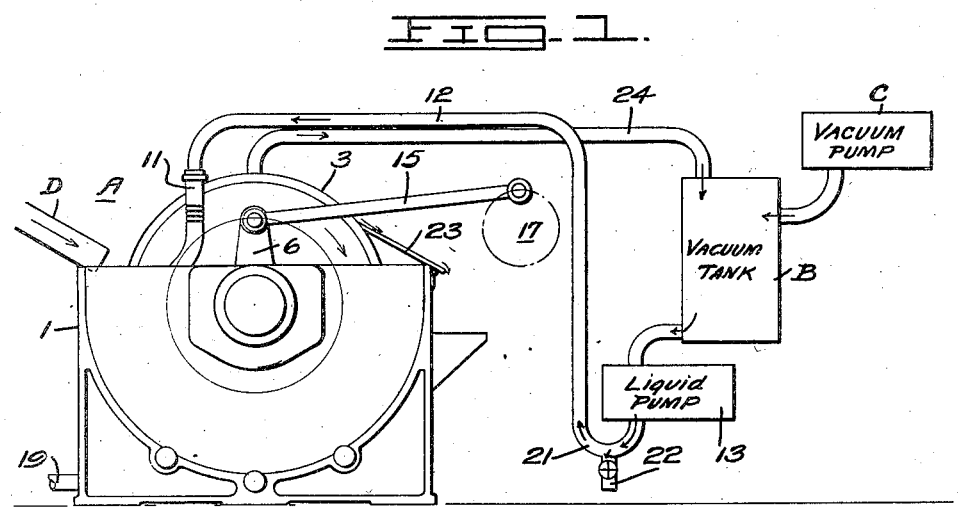
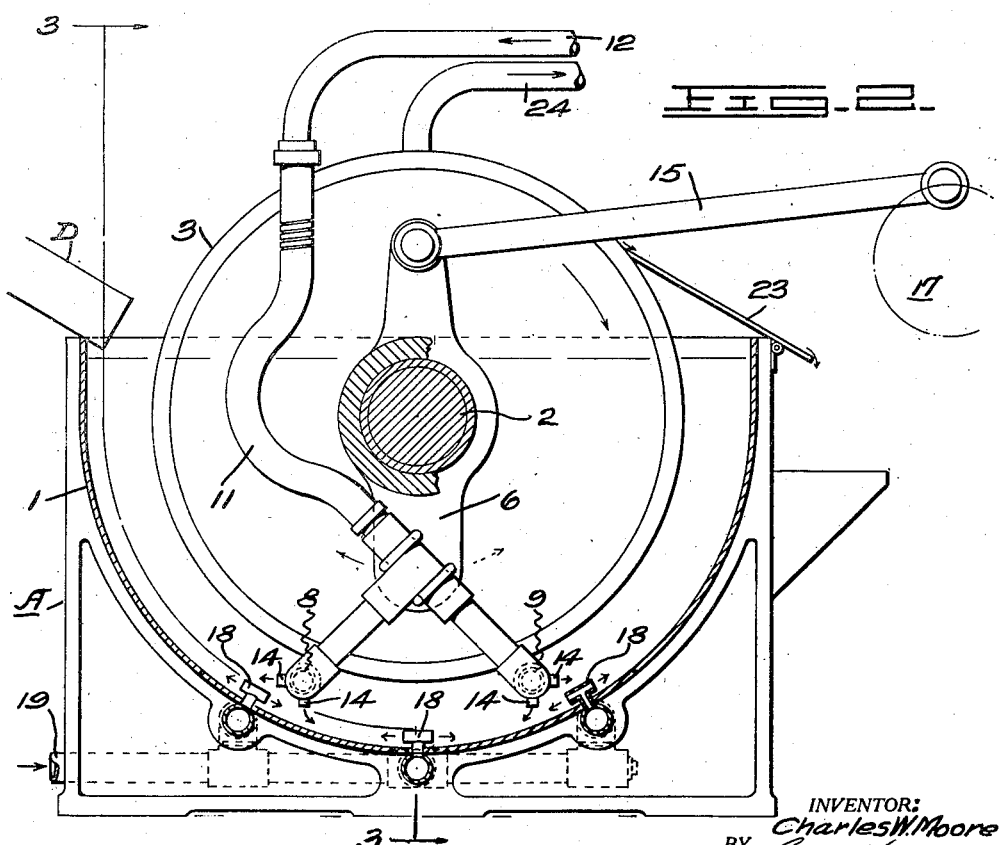
INVENTOR:
Charles W. Moore
BY
    ATTORNEY

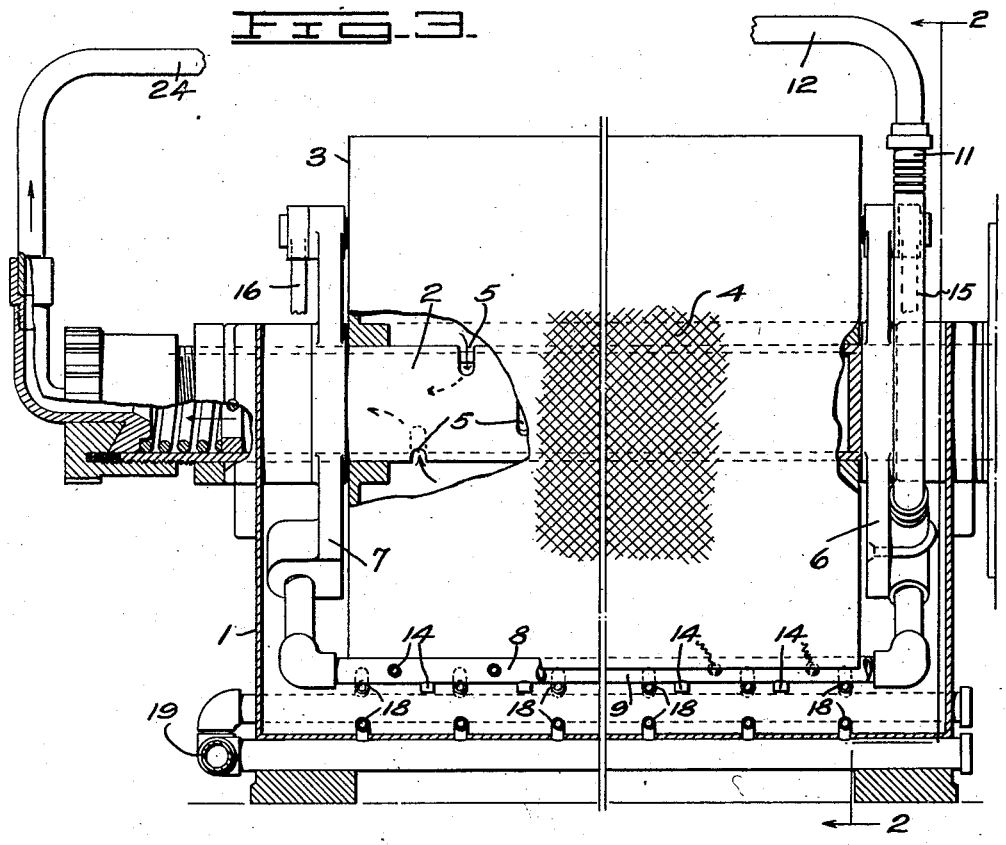
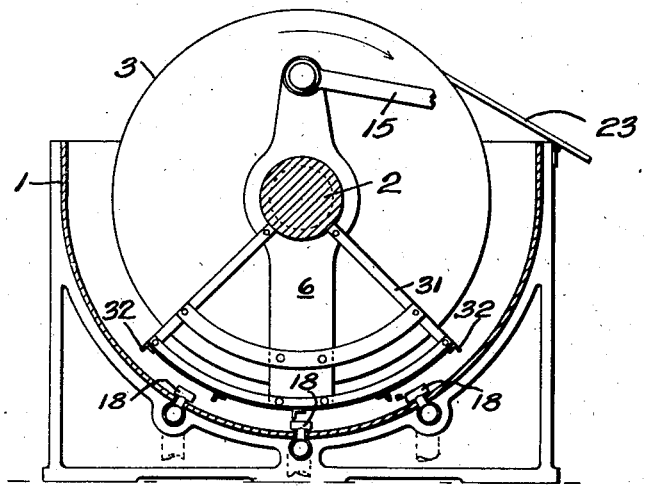

Patented May 17, 1932

1,858,900

UNITED STATES PATENT OFFICE

CHARLES W. MOORE, OF BARBERTON, OHIO, ASSIGNOR TO OLIVER UNITED FILTERS INC., OF SAN FRANCISCO, CALIFORNIA, A CORPORATION OF NEVADA

FILTER

Application filed December 10, 1928. Serial No. 324,948.

This invention relates to the method of and apparatus for separating solids from liquids by continuous filtration and is especially adapted to cases where the solids have a tendency to settle rapidly in the filter tank and thus interfere with filtration.

Since the separation of solids from liquids by continuous filtration also permits the separated solids to be effectively and economically washed and dried, it is desirable to effect the separation of all solids in this manner regardless of their characteristics.

As is well known in the art, continuous filtration can best be effected when the pulp is in such a condition that the solid particles are evenly distributed therein; in other words, the pulp should be homogeneous and of a substantially constant density throughout.

However, it has been found in practice that in certain pulps, feeds, or mixtures, and particularly in mixtures of comparatively coarse, crystalline solids, such as salt or sugar, there is a tendency for the solids to separate rapidly from the liquids to the bottom of the filter tank. The rapid settling characteristic of such solids may be attributed to various causes, in some cases, it may be due to the difference in the specific gravity of the solids and the liquids in which they are immersed, while in other cases where the specific gravity of the solids is the same as or even less than the pulp liquid, it may be due to the fact that such solids are readily wetted. Whatever the cause, the fact remains that some solids are fast or rapid settling and unless some means is provided for keeping such solids in suspension, it is impossible to deposit all of them on the filter medium, with the result that the solids continue to accumulate on the bottom of the filter tank until the filter is rendered inoperative.

To overcome this difficulty, certain types of filters have been provided with mechanical agitators to continuously stir the mixture in the tank and in some cases, such agitation has proved successful. In other cases, notably in the filtration of salt from a brine solution or other crystalline mixture, agitation has resulted in merely packing the solids more tightly in the bottom of the tank, thereby allowing the liquid portion of the mixture to pass through the filter medium at a higher rate than the solid content of the mixture is deposited on the filter medium to form a cake. For example, the mixture to be filtered may consist of a mixture of brine and salt which contains 50 pounds of salt per 100 pounds of brine. Due to the settling characteristic of salt, it is entirely possible for from 200 to 400 pounds of filtrate to pass through the filter medium in order to deposit 50 pounds of salt as filter cake. Since the filtrate is passing out of the tank at a higher rate than its quota of crystals are deposited, there is a thickening action in the tank, which, if continued, will cause the bottom of the tank to become blocked with solid crystals, making further operation impossible.

To overcome this settling action and the consequent concentration of the pulp, I have provided means of introducing and distributing in the bottom of the tank, a liquid usually of a character similar to the filtrate at a sufficient rate to maintain the mixture at the bottom of the tank in a fluid condition so that filtration may be carried on continuously without excessive accumulation of solids in the bottom of the tank. This liquid is preferably forced into the tank, under pressure, through suitable nozzles and not only provides the required dilution, but at the same time, effects a considerable agitation to help keep the solids in suspension.

In general, it is the object of this invention to provide a method and apparatus for maintaining a substantially homogeneous pulp throughout the filtration process.

Another object of the invention is the provision of a method of removing fast settling solids from liquids, consisting of continuously filtering a continuously diluted and agitated pulp.

Still another object of the invention is the provision of an apparatus for carrying out the process described, comprising a tank, a filter drum therein, means for supplying the tank with the mixture to be filtered, means for removing the collected cake from the filter, a mechanical agitator adapted to be oscillated between the walls of the tank and the filter drum, and means for constantly thinning the mixture being filtered by the addition of a liquid at a point adjacent to the location of the agitators.

The invention possesses other advantageous features, some of which, with the foregoing, will be set forth at length in the following description, where I shall outline in full that form of my invention which I have selected for illustration in the drawings accompanying and forming part of the present specification. In said drawings, I have shown one form of my invention, but it is to be understood that I do not limit myself to such form, since the invention as set forth in the claims, may be embodied in a plurality of forms.

Referring to the drawings:

Figure 1 is a diagrammatic representation of the filter system used in carrying out the objects of my invention.

Figure 2 is a vertical end section of a rotary drum filter embodying the objects of my invention and is taken along the plane indicated by the broken line 2—2 of Figure 3.

Figure 3 is a front vertical section taken along the broken line 3—3 of Figure 2 and looking in the direction indicated by the arrow.

Figure 4 is a vertical end section of a filter showing a modified form of agitating mechanism.

For carrying out the objects of this invention use is conveniently made of a rotary drum vacuum type filter generally designated as A, the interior of the drum of which is in communication with a vacuum tank B, which in turn is operated by a vacuum pump C. The pulp to be filtered is introduced into the tank of the filter A by means of a launder D. Thus far, the equipment described may be of any well known construction operating in the usual manner, that is, the pulp in the filter tank is subjected to the filtering action of the rotary drum, the filtrate is drawn into the interior of the drum and from there into the vacuum tank while the solid portion of the pulp is deposited as a cake on the exterior of the drum, is washed, dried and scraped or otherwise dislodged from the drum into any suitable container.

More specifically, the rotary filter A, consists of a semi-cylindrical tank 1, to the ends of which is journaled a hollow shaft 2. Keyed to the shaft 2 is a drum 3, the periphery of which is covered with a filter medium, septum, or screen 4. As in the usual form of rotary vacuum filter the drum 3 may consist of a plurality of sections, although this construction has not been shown in the drawings. As the drum rotates, these sections are progressively placed into communication with the interior of the hollow shaft 2 by any suitable means such as valved apertures 5. Since the construction of the rotary drum per se forms no part of my invention it has been thought unnecessary to further disclose its details of construction.

In order to effect the objects of my invention, namely, to continuously dilute and agitate the pulp contained in the filter tank 1 with a portion of the filtrate separated therefrom, cranks 6 and 7 have been journaled on the shaft 2 intermediate the ends of the tank 1 and the end of the drum 3. Secured to the lower end of these cranks are a plurality of pipes 8 and 9 (best shown in Figure 3) extending longitudinally of the drum 3 and disposed between the drum and the tank 1. As clearly shown in Figures 2 and 3, the pipes 8 and 9 may be conveniently secured to the cranks 6 and 7 by standard pipe couplings, such as T's, nipples and elbows. Communicating with the right hand ends of the pipes 8 and 9 by means of the couplings just mentioned is a flexible hose 11, which in turn is connected with a conduit 12 in communication with the pressure side of a liquid pump 13. As shown in Figure 1, the intake side of the pump 13 is in communication with the vacuum tank B. Since it is unnecessary that both ends of the pipes 8 and 9 be placed in communication with the liquid pump 13, their left hand ends have been terminated in the crank 7. A plurality of nozzles 14 secured longitudinally along the pipes 8 and 9 serve to discharge the filtrate passing therethrough from the vacuum tank, in jets or streams along the bottom of the filter tank 1.

The upper end of the cranks 6 and 7 are pivotally secured to connecting rods 15 and 16 which in turn are connected with a prime mover 17. The action of the prime mover causes the cranks 6 and 7 to oscillate the pipes 8 and 9 along the bottom of the tank 1.

Further dilution and agitation of the pulp may be effected by providing the floor of the filter tank 1 with a plurality of rows of longitudinally extending nozzles 18, each of which is placed in communication with a pipe 19 which in turn communicates with the liquid pump 13 or some other convenient source of pulp diluting liquid. The conduit 12 is preferably provided with a valved T 21 for permitting a pre-determined amount of the filtrate to be returned to the filter tank 1 through the nozzles 14 and 18 and for permitting the remainder of the filtrate to be discharged through the lower end 22 of the T 21. Following standard practice a scraper 23 operatively engages the drum 3 to dislodge the cake deposited thereon.

The operation of the apparatus above described is as follows:

The pulp to be filtered is continuously or periodically introduced into the filter tank 1 by means of the launder D. The drum 3 is then made to rotate by means of suitable mechanism not shown or described and is made to operate in the usual well known manner. The filtrate is drawn through the filter medium or screen 4 and is drawn by the action of the vacuum pump C through the conduit 24 into the vacuum tank B. From the vacuum tank a predetermined portion of the filtrate is returned through the conduit 12 to the oscillating nozzles 14 and to the stationary nozzles 18 thereby simultaneously diluting and agitating the pulp within the filter tank. The stroke of the crank 8 is preferably sufficient to rock or oscillate the nozzle carrying pipes 8 and 9 through an angle slightly greater than the angle determined by the pipe 8, the axis of the shaft 2, and the pipe 9, for it is desirable to have the limiting positions of the pipes 8 and 9 overlap each other somewhat. For some classes of pulp the dilution and agitation effected by means of the stationary nozzles 18 is sufficient without the necessity of the additional action of the oscillating nozzles 14. In other cases where greater agitation is required the oscillating nozzles 14 may be used without the aid of the stationary nozzles 18 while in still other cases, both sets of nozzles may be advantageously used. Use of the stationary nozzles alone effects a dilution and hydraulic agitation of the pulp. Use of the oscillating nozzles alone produces a dilution of the pulp coupled with mechanical as well as hydraulic agitation.

When a still greater amount of agitation is required advantage may be taken of the modified form of my invention shown in Figure 4. In this modification, the cranks 6 and 7 may be provided with sectors 31 to which are secured along their lower arcuate edges, a plurality of rakes 32. The travel of these rakes adjacent the floor of the filter tank 1 produces a mechanical agitation of the pulp which when combined with the diluting and hydraulic agitating action of the stationary nozzles 18 is sufficient to maintain the pulp in a substantially homogeneous condition.

In each instance the hydraulic agitation effected by jets or streams from either the stationary or oscillating nozzles, can be controlled by regulating the pressure at which the diluting liquid is forced into the tank.

It has ben found by actual test that since a pulp whose solid content is freely or fast settling may be effectively maintained in a substantially homogeneous condition by making use of the method of dilution and agitation above described, pulps of this character may be readily filtered by the action of some form of continuous filter. The precise form of filter used is immaterial, as likewise is the liquid by which dilution is effected.

I claim:

1. An apparatus of the class described comprising a filter tank, a rotary filter therein, means to supply the tank with the pulp to be filtered, a mechanical agitator within said tank, and a series of jets carried by the agitator adapted to introduce a liquid under pressure to increase the ratio of liquids to solids in the mixture during filtration.

2. An apparatus of the class described comprising the combination of a tank, a filter element within said tank, means for moving said filter element during filtration, an oscillating mechanical agitator within said tank, a plurality of nozzles carried by said agitator, and means to supply fluid to said nozzles to agitate the mixture during filtration.

3. An apparatus of the class described comprising the combination of a tank, a rotary filter drum therein, an oscillating mechanical agitator between the walls of the drum and the tank, a plurality of nozzles carried by said agitator, and means for supplying a liquid to the mixture being filtered through said nozzles during the agitating and filtering process.

4. An apparatus of the class described comprising a filter tank, a rotary filter therein, means to supply the tank with pulp, means to remove the cake from the filter, a swinging agitator, means to oscillate said agitator, a series of pipes carried by the agitator having downwardly directed jets, and means to supply the pipes with the filtrate whereby the solids collected in the tank will be agitated and mixed with the pulp.

5. An apparatus of the class described comprising a tank, a filter drum therein, means to supply the tank with pulp, means to remove the collected cake from the filter, a swinging agitator adapted to be oscillated below the drum in the tank to stir up any solids that may drop upon the tank bottom, a plurality of pipes carried by said agitator and having downwardly directed jets, and means to supply said pipes with filtrate from the filter whereby the agitation of the solid particles in the pulp will be facilitated.

In testimony whereof, I have hereunto set my hand.

CHARLES W. MOORE.